United States Patent [19]

Després

[11] Patent Number: 4,558,771
[45] Date of Patent: Dec. 17, 1985

[54] CLUTCH COVER ASSEMBLY
[75] Inventor: Dominique Després, Clichy, France
[73] Assignee: Valeo, Paris, France
[21] Appl. No.: 559,376
[22] Filed: Dec. 8, 1983
[30] Foreign Application Priority Data Dec. 16, 1982 [FR] France ................... 82 21097

[51] Int. Cl.[4] ........................................... F16D 13/44
[52] U.S. Cl. .......................... 192/70.18; 192/70.28;
192/89 B; 192/109 R
[58] Field of Search ............... 192/70.18, 70.28, 89 B,
192/109 R

[56] References Cited

U.S. PATENT DOCUMENTS

| 2,195,663 | 4/1940 | Wolfram | 192/70.28 |
| 2,277,557 | 3/1942 | Nutt | 192/70.18 |
| 3,489,256 | 1/1970 | Binder et al. | 192/70.18 |
| 3,640,361 | 2/1972 | Spichala | 192/70.18 |
| 3,702,651 | 11/1972 | Fujita et al. | 192/70.28 |
| 4,039,059 | 8/1977 | de Gennes | 192/89 B |
| 4,069,905 | 1/1978 | de Gennes | 192/70.18 |
| 4,200,176 | 4/1980 | Courbot | 192/89 B |
| 4,210,233 | 7/1980 | Courbot | 192/89 B |
| 4,211,315 | 7/1980 | Fenant | 192/89 B |
| 4,326,611 | 4/1982 | Billet | 192/89 B |

FOREIGN PATENT DOCUMENTS 2607925  9/1977  Fed. Rep. of Germany .
2607939  9/1977  Fed. Rep. of Germany .
1309117 10/1962  France .

Primary Examiner—Ira S. Lazarus
Attorney, Agent, or Firm—Charles A. Brown; Charles E. Brown

[57] ABSTRACT

A clutch cover assembly comprises at least three components including a cover, a pressure plate and a diaphragm spring. At least one peg is provided to limit movement of the pressure plate. The peg comprises at least one snap-fastener adapted to immobilize it in the axial direction on a first of the components. It further comprises a head incorporating a barrel and a retaining shoulder, the barrel being radially spaced from a retaining edge adjacent an abutment surface on a second of the components. In normal operation of the assembly, this provides for relative sliding of the edge and the barrel whereas, in the storage position of the assembly, the shoulder is in abutting relationship with the abutment surface.

15 Claims, 18 Drawing Figures

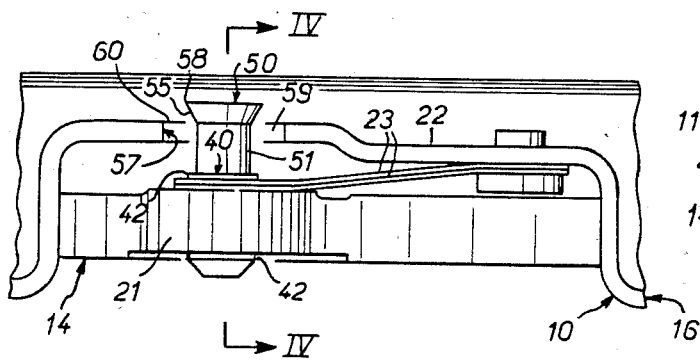
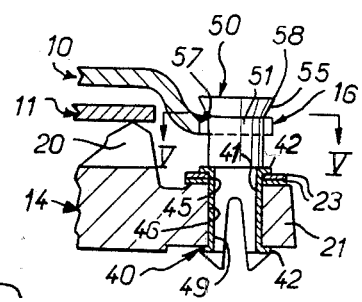

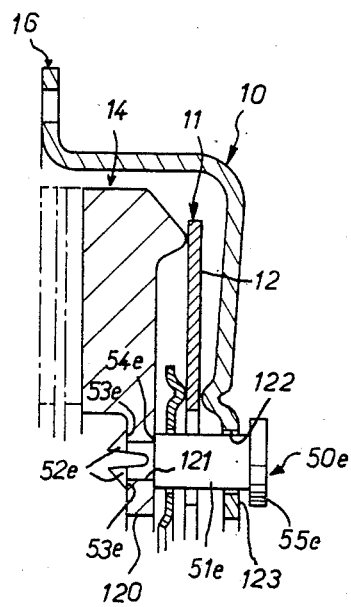
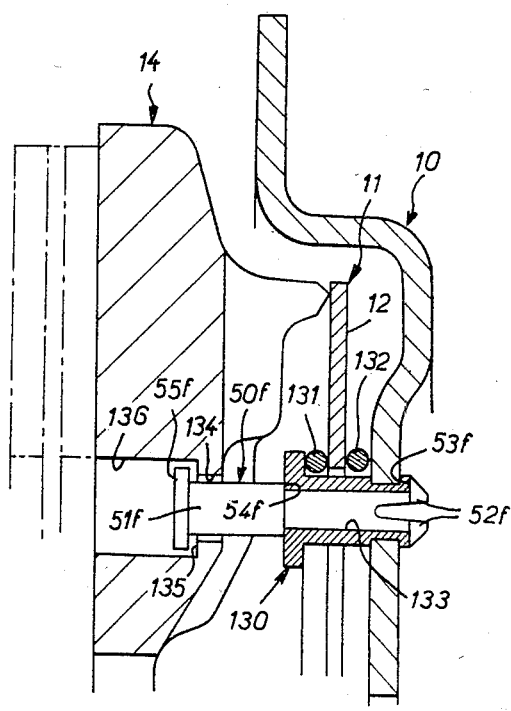
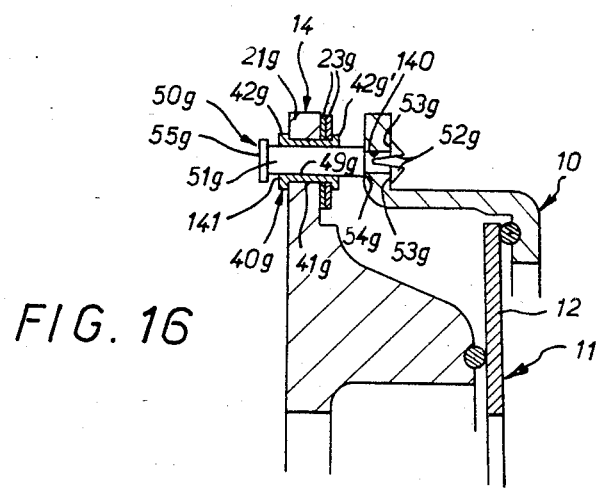

FIG. 18
FIG. 17
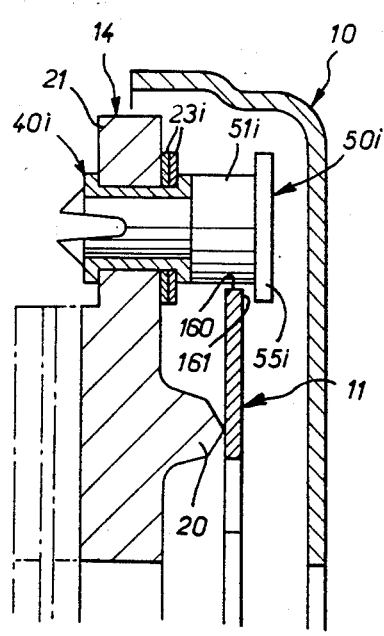
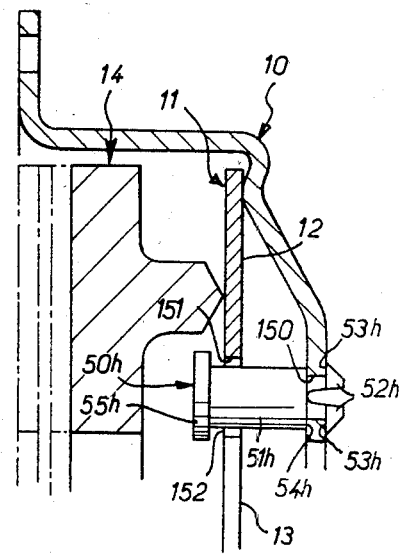

CLUTCH COVER ASSEMBLY

BACKGROUND OF THE INVENTION

1. Field of the Invention

The present invention relates to a clutch cover assembly, in particular for automotive vehicles, of the kind comprising a pressure plate, elastic means such as a diaphragm spring and a cover.

2. Description of the Prior Art

The invention is more particularly concerned with means for limiting the travel of the pressure plate to prevent the drive tangs, constituting the rotational linkage between and permitting axial movement between the pressure plate and the cover, tending to deteriorate when the pressure plate/diaphragm spring/cover combination is pre-assembled, but not yet bolted to the reaction plate. This situation occurs routinely, when pre-assembled units are kept in store, for example.

The function of the tangs in question is not only to link the pressure plate elastically to the cover, but also to contribute to urging the pressure plate to the released position on releasing the clutch, to prevent the pressure plate rubbing on the friction disk. For this purpose, these tangs are treated to provide sufficient elastic return force.

When the pre-assembled combination is not bolted to the reaction plate, the pressure plate is urged strongly outwards by the diaphragm spring. As the only force to resist this is that provided by the tangs, these are also urged outwardly until equilibrium is established between the return force of the tangs and the force of the diaphragm spring. The tangs are therefore deformed and this distension may result in deterioration of their return force properties.

Deterioration may also occur, even if expansion of the diaphragm spring is limited, during careless handling in particular, as when dropped, for example: by virtue of its non-negligible weight and inertia, the pressure plate may move away from the cover to an extent sufficient to bring about significant deterioration of the return force properties of the tangs.

For this reason it is important to provide means for limiting the travel of the pressure plate.

The provision of these means for limiting the travel of the pressure plate is not always indispensable, however.

Clutch cover assemblies supplied as original equipment are in most cases, after inspection, carefully stored in packing cases, with protective means placed between them, and delivered directly to the manufacturer for fitting on his production lines.

In view of the relatively limited number of handling operations, it is rare for clutch cover assemblies to be returned due to deterioration of the tangs.

This does not apply when the clutch cover assemblies are supplied as replacement parts, as they are then subject to numerous handling operations at all points in the distribution chain, and are sometimes stored in a careless manner, by being piled up, for example.

This leads to returns, the return force properties of the tangs having deteriorated as a result of impact, being dropped and other causes, especially in the case of clutch cover assemblies in which no means of limiting the expansion of the diaphragm spring are provided, there being equilibrium in the storage state between the return force exerted by the tangs and that exerted by the elastic means.

In French patent application No 82 01809, the assignees of the present inventor have previously proposed a method of limiting the travel of the pressure plate which may be utilized only on clutch cover assemblies intended for use as replacement parts.

These limiting means consist in a peg comprising a barrel and, as a general rule, two lugs incorporating a shoulder and elastically deformable towards one another. The peg is force-fitted or lightly crimped by means of its barrel in an appropriate bore formed either in the cover or in the pressure plate. The lugs which can deform elastically towards one another slide freely in a bore formed in a second of the two components, after the shoulders on said lugs which can deform elastically towards one another have passed through the bore.

The pressure plate is retained in the axial direction through the cooperation of the shoulders on these lugs with an abutment surface formed around the second bore.

Although generally satisfactory, the use of these pressure plate travel limiting means is not always easy in the case of certain clutch cover assemblies, and, broadly speaking, two types of problem have been encountered.

Firstly, in attempting to fit the pressure plate travel limiting pegs manually, it has been found that it is not always easy to force fit or lightly crimp the pegs into the bores provided to this end in the pressure plate or in the cover.

The diameter of the barrels of the pegs is not always constant and the manual insertion of the peg in the bore is sometimes rendered difficult by an excessive diameter.

Secondly, the use of the pegs in question is difficult where it is required to prevent slight radial displacements of the pressure plate. As is well known in this art, in certain cases an impact to the edge of the clutch cover assembly applies buckling loads to at least one tang, even with such pegs fitted. Further bending of only a few hundredths of a millimeter can generate stresses with deleterious consequences as to the return force properties of the tangs, through exceeding their elastic limit. As the radial gap between the bore and the lugs of the peg is of the order of a few tenths of a millimeter, it can be seen that the pressure plate may easily move a few hundredths of a millimeter as a result of inertia.

The present invention is directed towards a clutch cover assembly in which the insertion of the pegs is significantly facilitated. In one advantageous embodiment, the pegs may also serve to retain the pressure plate in the radial direction.

SUMMARY OF THE INVENTION

The invention consists in a clutch cover assembly comprising a combination of at least three components adapted to be pre-assembled prior to utilization, said combination incorporating a cover which is fixed in the axial direction, a plate which is movable in the axial direction and elastic means operatively disposed between said cover and said plate, said clutch cover assembly further comprising a peg adapted to limit movement of said plate and comprising at least one snap-action fastener adapted to immobilize it in the axial direction relative to a first of said components and a head incorporating a barrel and a retaining shoulder, a second of said components having a retaining edge, said barrel being radially spaced from said retaining edge so as to permit, in normal operation of said assembly, relative sliding movement of said barrel and said edge, and said shoulder being adapted for engagement with said edge in an abutting relationship when said assembly is in a storage configuration.

The shoulder may with advantage comprise an inclined surface in face to face relationship with the edge.

By virtue of these arrangements, the fitting of the pegs is facilitated thanks to the snap-action fastener which may, with advantage, consist of two lugs deformable elastically towards one another and provided with a shoulder, each lug forming, with its shoulder and the base of the barrel of the peg, a notch adapted to immobilize it in the axial direction in a bore formed either in the cover or in the pressure plate.

The provision of an inclined surface on the shoulder of the head of the peg provides for immobilization of the pressure plate in the radial direction, through its cooperation with the retaining edge.

Other objects and advantages will appear from the following description of an example of the invention, when considered in connection with the accompanying drawings, and the novel features will be particularly pointed out in the appended claims.

BRIEF DESCRIPTION OF THE DRAWINGS

FIG. 3 is a partial view of the clutch cover assembly in the direction of the arrow III in FIG. 1.

FIG. 4 is a view in cross-section on the line IV—IV in FIG. 3.

FIG. 5 is a partial cross-section through the assembly on the line V—V in FIG. 4.

FIG. 6 is a view in elevation of the peg utilized in the embodiment shown in FIGS. 1 to 5.

FIGS. 9 and 10 are partial views corresponding to FIGS. 7 and 8, illustrating a further embodiment.

FIGS. 14 to 18 are partial cross-sections corresponding to FIG. 2 and illustrating five still further embodiments of the clutch cover assembly in accordance with the present invention.

DESCRIPTION OF THE PREFERRED EMBODIMENTS

Figures 1, 2:
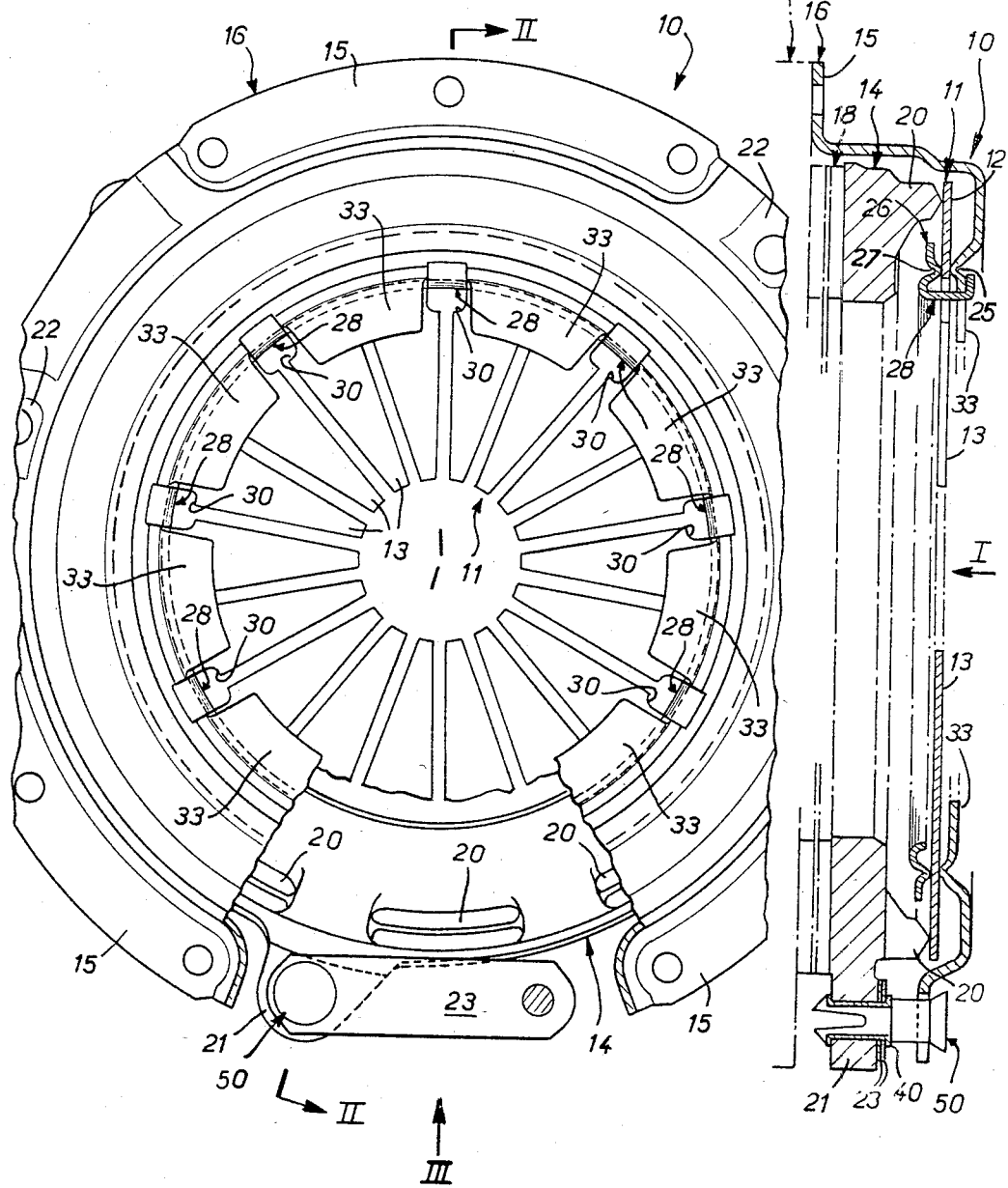
FIG. 1 is a view in elevation in the direction of the arrow I in FIG. 2 of the clutch cover assembly in accordance with the present invention.
FIG. 2 is a view of the clutch cover assembly in cross-section on the line II—II in FIG. 1.

In the selected embodiment shown in FIGS. 1 to 6, the diaphragm spring type clutch cover assembly in accordance with the invention generally comprises a first generally annular component 10, called the cover, a second generally annular component 11, called the diaphragm spring and having a peripheral part 12 forming a Belleville washer and a central part subdivided into radial fingers 13, assembly means to be described in more detail hereinafter pivotally attaching the diaphragm spring 11 to the cover 10, and a third annular component 14, called the pressure plate, which is constrained to rotate with the cover 10 while being axially movable relative thereto, as will be described in more detail hereinafter, on which the peripheral part of the diaphragm spring 11 forming the Belleville washer 12 bears. The combination of these components is generally pre-assembled and stored prior to final assembly.

Areas 15 on a peripheral radial flange 16 of the cover 10 are adapted to be attached to a reaction plate or flywheel 17, represented schematically for purely illustrative purposes in chain-dotted line in FIG. 2 and attached to a first shaft, in practice a driving shaft. Inserted between the reaction plate 17 and the pressure plate 14 is a friction disk 18, also represented schematically in chain-dotted line in FIG. 2, which is constrained to rotate with a second shaft, in practice a driven shaft.

The pressure plate 14 has a number of spaced axial bosses 20 on which bears the peripheral part of the diaphragm spring 11 forming the Belleville washer 12.

On the periphery of the pressure plate 14 are spaced radially projecting lugs 21 between which and areas 22 of peripheral flange 16 of cover 10 extend, in a direction substantially tangential to a circumference of the assembly, drive tangs 23 constraining it to rotate with the cover 10 while permitting it to move in the axial direction (see FIG. 3). These tangs are riveted to the cover and to the plate.

These arrangements are well-known in themselves, and since they do not constitute part of the present invention they will not be described in further detail here.

The cover 10 offers primary support to the diaphragm spring 11, more particularly to the inner perimeter of the peripheral part thereof forming the Belleville washer 12, at the internal perimeter of this peripheral part. In the embodiment shown, it is formed for this purpose with an annular half-wave deformation constituting a first support ring 25 (FIG. 2).

The assembly means pivotally attaching the diaphragm spring 11 to the cover 10 comprise a fourth annular part or ring 26 which, on the one hand, offers a circular secondary support for the diaphragm spring 11, on the side of the latter opposite the cover 10, and to this end has, in the embodiment shown, in line with the half-wave deformation 25 in the cover 10, a comparable half-wave deformation 27; on the other hand, it is provided with integral thin flat retaining lugs 28 by means of which it is coupled to the cover 10 and which each pass through the diaphragm spring 11 by means of an opening 30.

The retaining lugs 28, of which there are nine in the embodiment shown, are thus integral with the ring 26, the combination being obtained, for example, by appropriately cutting and bending a common blank.

Between the retaining lugs 28, the cover 10 has lugs 33 which are intended to limit distension of the diaphragm spring 11.

The combination of the four generally annular components is, as a general rule, pre-assembled and stored prior to mounting on the reaction plate.

One embodiment of the means for limiting the travel of the pressure plate in the axial and radial directions will now be described with reference to FIGS. 2 to 6, on the hypothesis that the clutch cover assembly is in the pre-assembled position but not yet bolted to the reaction plate.

A tang 23 consisting in this case of a pair of thin flat members is riveted to the lug 21 by means of a hollow rivet 40 comprising a hollow cylindrical body 41 which extends parallel to the axis of the assembly and two annular clamping heads 42. The rivet 40 is inserted into a bore 45 in the tangs 23 and a bore 46 in the lug 21. In the conventional manner, the heads 42 are obtained by crushing projecting portions of the hollow cylindrical part 41 onto the lug 21 and the tang 23, and enable the rivet 40 to fulfil its function of fixing the tang 23 to the plate 14.

The means in accordance with the invention for limiting axial and radial movement of the pressure plate will now be described.

A peg 50 comprising a head with a cylindrical barrel 51, a shoulder 55 and two lugs 52 which can deform elastically towards one another (FIG. 6) is inserted into the axial bore 49 in the rivet 40. In this example, the peg is made from a synthetic material and the lugs 52 which can deform elastically towards one another are formed from a cylinder coaxial with the barrel 51 and of substantially smaller diameter.

In accordance with the present invention, each lug is provided with a shoulder 53 which, in cooperation with a bearing shoulder 54 defined by the annular space delimited by the cylinder on the base of the barrel 51 from which the lugs 52 are formed, constitutes in this example a snap-action fastener adapted to immobilize the peg 50 in the axial direction in the bore 49. To this end, the shoulders 53 and 54 are designed to cooperate with the heads 42, and the axial distance separating the clamping heads is substantially equal to the length of the lugs 52 between the shoulders 53 and 54, so that the latter butt up against said clamping heads 42 in the axial direction.

In this embodiment of the present invention, the shoulder 55 is frustonconical and the diameter of its smaller end is identical to that of the barrel 51.

The cylindrical barrel 51 passes through a notch 57 formed at the perimeter of the cover 10. The width of the notch 57 in the circumferential direction is greater than the diameter of the largest diameter circular edge 58 of the frustonconical shoulder 55. On the other hand, the bottom 59 of the notch is adapted, by means of a so-called "retaining edge" 60, to interfere with the shoulder 55 in the storage position. This edge 60 is with advantage of circular arc shape centered on the axis of the assembly.

When the assembly is bolted to the reaction plate and is in the clutch engaged position, and when the friction facings of the friction disk 18 have worn down, the frustonconical shoulder 55, forming a limiting member, remains at an axial distance from the retaining edge 60 of the notch 57, so that it is not possible for any contact to occur during operation between this shoulder and said edge, given the manufacturing tolerances and the deformation to which the various component parts constituting the assembly are subjected. The same applies a fortiori to the cylindrical barrel 51 of the head of the peg 50 which is radially spaced from the retaining edge 60, so that relative sliding of the edge 60 and the barrel 51 can occur during operation. Consequently, rubbing of the barrel 51 on the cover 10 is impossible.

When the assembly is in the storage condition, as applies, for example, to assemblies sold as replacement parts and stored in an automobile parts retail outlet, the diaphragm spring 11 urges the pressure plate 14 outwards. The shoulder 55 on each peg 50 then, for preference, butts up against the edge 60 of the bottom of the corresponding notch 59. As a result of the cohesion thus obtained, no axial or radial movement of the pressure plate is possible. Cohesion is simultaneously obtained in the circumferential direction by virtue of friction. The assembly can then withstand all kinds of impact without damage to the tangs. Note that the circumferential clearance provided between the notch 57 and the frustonconical shoulder 55 prevents, in the event of an impact, any circumferential contact between the notch and the frustonconical shoulder, which could in certain cases bring about unacceptable buckling of the tang.

Note that these means of limiting axial and radial movement of the pressure plate may be utilized without major modification to certain existing clutch cover assemblies. In certain prior art assemblies, the rivet fixing the tangs 23 to the lugs 21 has an overall shape corresponding to that of a peg surmounted by a cylindrical retaining shoulder which comes into abutting relationship with an abutment surface formed around a bore in the cover 10 at the position of the notches 57.

The limiting means in accordance with the present invention may be adapted to these prior art assemblies at very low cost since it is sufficient to replace the rivets with hollow cylindrical rivets 41 in accordance with the present invention and to equip the bores 49 in these rivets with pegs 50 equipped either with a frustoconical shoulder 55 (in which case it is necessary to modify the bores in the plates and to convert them to notches like notch 57 in FIG. 5) or cylindrical shoulders which can then come into abutting relationship with the abutment surfaces already formed around the bores provided for this purpose in the covers.

Note also that when the assembly equipped with pegs comprising frustonconical shoulders 55 is bolted to the reaction plate, the pressure plate moves and said frustoconical shoulders 55 automatically disengage from the edges 60, without suffering any damage and irrespective of any possible lack of parallelism and the position of the pressure plate in the storage position. It will be understood that, as in certain other embodiments, when the assembly is bolted to the reaction plate the radial clearance between the limiting member and the retaining member increases.

Further embodiments of the assembly in accordance with the present invention will be described with reference to FIGS. 7 to 18. These embodiments employ a peg 50 which may or may not comprise a frustonconical shoulder. In these embodiments, the component parts of the clutch cover assembly analogous to those represented in FIGS. 1 to 6 carry the same reference numerals. In certain cases, lowercase letter suffixes have been added to the reference numerals to make it easier to distinguish the component parts thus referenced from one another.

One further embodiment of the invention will now be described with reference to FIG. 7.

In the conventional manner, the cover 10 comprises two series of areas 22, 22' to which are screwed the tangs 23.

When the motor rotates anti-clockwise, the areas 22 are used to attach the tangs 23, so that the latter operate in tension.

In the conventional manner, when the motor rotates clockwise, the areas 22' are used so that the tangs 23 also operate in tension. These arrangements are well-known and will therefore not be described in more detail here.

Figure 7:
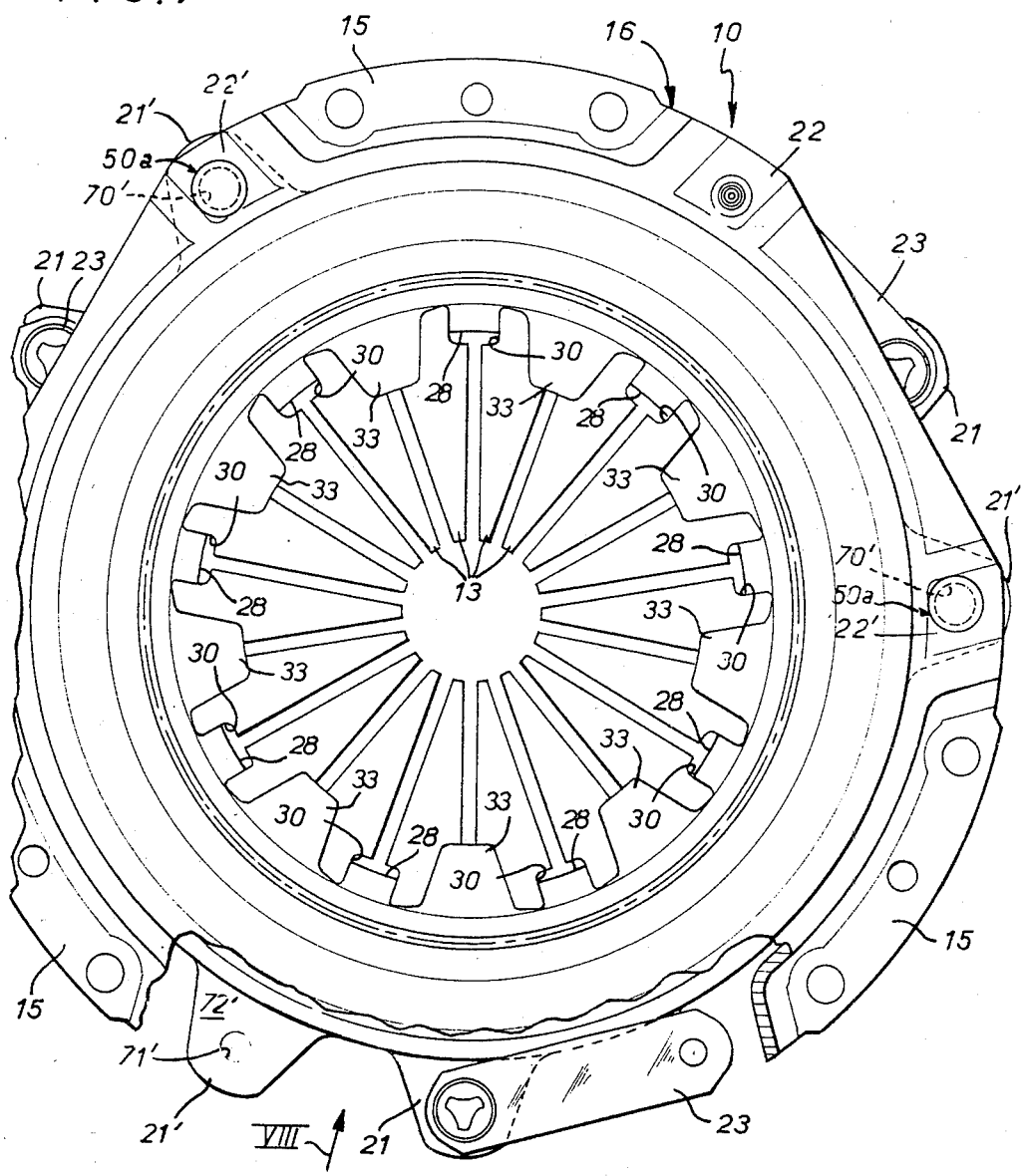
FIG. 7 is a view in elevation of a clutch cover assembly similar to that of FIG. 1, showing another embodiment of the present invention.
Figure 8:
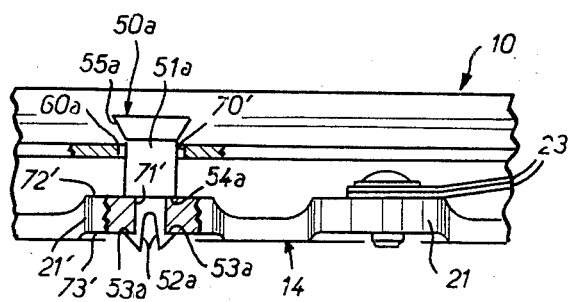
FIG. 8 is a partial view of the assembly in the direction of the arrow VIII in FIG. 7.

In the embodiment shown in FIGS. 7 and 8, the pressure plate is equipped with a second series of lugs 21: lugs 21' adapted for the attachment by screwing of tamgs 23. The lugs 21' are disposed in line with the areas 22' (FIG. 7).

To permit said tangs 23 to be screwed to the lugs 21 (21'), the latter comprise a bore 71 (71'). Similarly, to permit the tangs to be screwed to the areas 22 (22'), the latter comprise a bore 70 (70').

In the selected embodiment shown in FIG. 8, a peg 50a, similar to the peg 50 in FIG. 6, is inserted through the bores 70', 71'. The length of the lugs 52a of the peg 50a is such that the shoulders 54a and 53a respectively come into contact with the surfaces 72' and 73' of the lug 21', with the result that the peg 50a is immobilized in the axial direction and rendered fast with the pressure plate 14.

Like the peg 50, the peg 50a comprises an inclined surface or frustoconical shoulder 55a which, in normal operation of the assembly, is spaced from the edge 60a of the bore 70'.

In the storage position, this edge 60a acts as a retaining edge and the frustonconical shoulder 55a is engaged against this edge 60a.

It has already been mentioned that in the embodiment shown in FIG. 7 the motor rotates anti-clockwise and the tangs 23 operate in tension. The same cover and the same pressure plate can be used for a motor rotating in the opposite direction. To this end, it is merely necessary to effect relative rotation of the plate and cover until each lug 21 comes into face-to-face relationship with an area 22 and lugs 21' are in the former positions of lugs 21. The tangs may therefore be disposed between lugs 21' and areas 22' of the peripheral flange of the cover 10, whereas the pegs 50a are inserted into the bores 70 in the areas 22 and slide freely in the bores 71 in the lugs 21.

It will be noted that this embodiment of the present invention is relatively easy to apply and may be used at reduced cost on existing clutch cover assemblies of the kind represented in FIG. 7. These clutch cover assemblies already comprise lugs 21, 21: and areas 22, 22' bored to permit the fixing of tangs 23. It is therefore sufficient to produce pegs 50a in which the diameter of the cylinder from which the lugs 52a are formed corresponds to the diameter of the original bores 71', so that after insertion of the lugs of the peg into this bore, they bear against the surface 73' of the lug 21'. The peg 50a comprising a barrel 51a of substantially greater diameter, to enable it to slide freely in the bores 70 (70') in the areas 22 (22'), it is sufficient to enlarge the original bores in each of said areas designed to accommodate a peg.

Note also that in this embodiment the pegs 50a are provided with a frustoconical shoulder 55a to permit immobilization of the pressure plate in the axial and radial directions when in the storage position. It will be understood that if such precise immobilization of the pressure plate is not required, the pegs 50a could incorporate a shoulder of cylindrical shape.

A further embodiment of the present invention, which consists of a variant on the embodiment described above, will now be described with reference to FIGS. 9 and 10.

In this embodiment, the lugs 21b are of greater circumferential extent than the lugs 21, 21' in FIGS. 7 and 8 and have two identical bores 710, 711. The tangs 23b extend between the lugs 21b and the areas 22b or 22b', depending on the direction of rotation. Each tang is screwed into the bore which is the furthest in the circumferential direction from the area of the cover to which it is also screwed so that, irrespective of the direction of rotation of the motor, the tang 23b passes over the second bore in the lug 21b.

In the embodiment shown in FIGS. 7 and 8, the tangs 23b have a bore 712 disposed in line with the unused bore in lug 21b (711 in this instance). The peripheral flange of the cover, between areas 22b and 22b', in this embodiment comprises a plane area 220 with a central bore 221.

A peg 50b similar to peg 50 but comprising a cylindrical shoulder 55b is inserted into bores 711 and 221. By means of its lugs 52b and its shoulders 53b and 54b the peg 50b is rendered fast with the cover 10. The bore 711 and the barrel 51b of the peg 50b are such that in normal operation of the assembly the barrel 51b slides with clearance in the bore 711, whereas in the storage position of the assembly, the shoulder 55b comes into contact with the edge 60b of the bore 711 in the lug 21b.

Note that in this example the shoulder 55b is cylindrical and comprises a surface 550b parallel to the surface of the lug 21b. In the storage position, the entire surface 550b is applied against an annular portion of the outside surface of the lug 21b adjacent the retaining edge 60b and which for convenience will be referred to as the abutment surface 210b.

In the embodiment shown in FIGS. 9 and 10, the motor rotates anti-clockwise and the tangs 23b operate in tension. It is possible for the motor to rotate in the opposite direction. It is merely necessary to effect relative rotation of the plate and the cover so as to bring the bore 710 into line with the bore 221, a tang symmetrical to the tang 23b being screwed into the bore 711 and onto the area 22b'. As previously, the peg 50b is rendered fast with the cover 10 in the bore 221, but passes through the bore 710 in the lug 21b. The abutment surface is then around said bore 710.

A further embodiment of the invention will now be described with reference to FIGS. 11 and 12.

Figure 11:
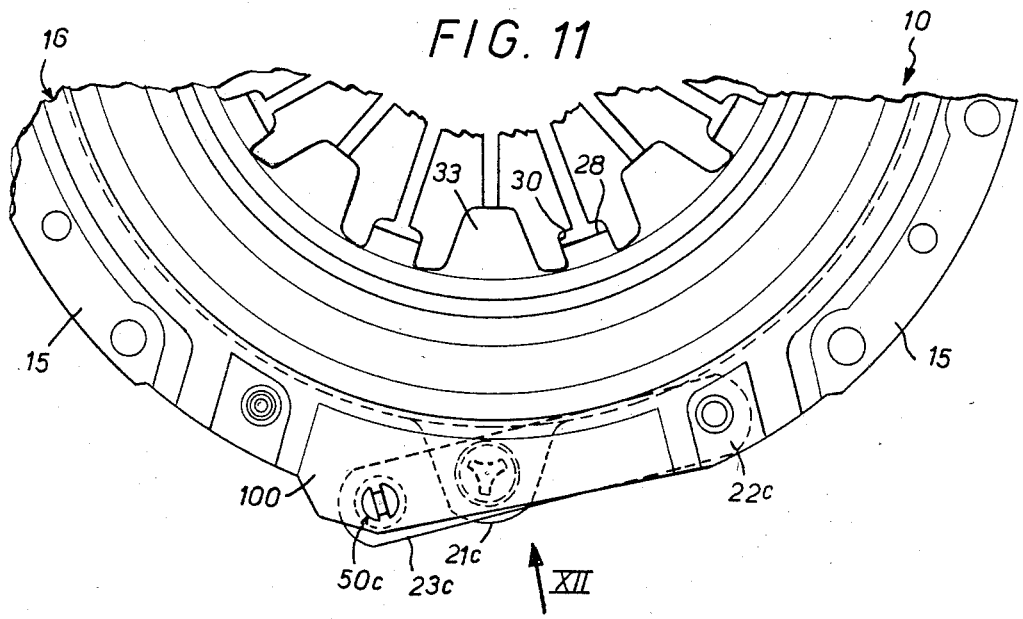
FIGS. 11 and 12 are partial views corresponding to FIGS. 7 and 8, illustrating a yet further embodiment.

As can be seen from FIG. 11, the areas 22c of the peripheral flange 16 of the cover 10 (see FIG. 7) have been modified by the addition of an extension 100 which almost wholly overlaps the drive tang 23c. The latter is substantially longer than those described hereinabove.

In this embodiment, the extension 100 is provided with a bore 101 disposed in line with a corresponding bore 102 in an extension of the tang situated beyond the lug 21c. A peg 50c equipped with a cylindrical shoulder 55c is inserted in the bores 101 and 102. By means of its lugs 52c and its shoulders 53c and 54c, the peg 50c is immobilized in the axial direction in the bore 101 in the cover 10 and rendered fast with the latter. The barrel 51c of the peg slides freely in the bore 102 and, in the storage position of the assembly, the cylindrical shoulder 55c butts up against an abutment surface 103 on the tang 23c around the bore 102.

Note that in this embodiment it is the drive tang 23c on which is formed the abutment surface which cooperates with the peg 50c and which thus acts as an axial retaining member for the pressure plate.

Figure 12:
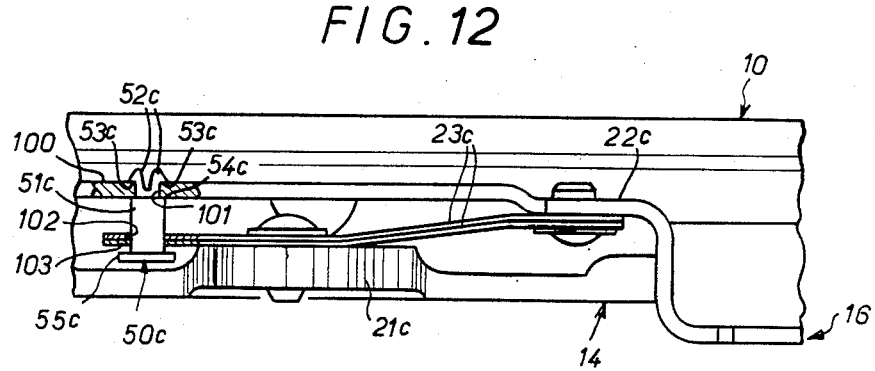
Figure 13:
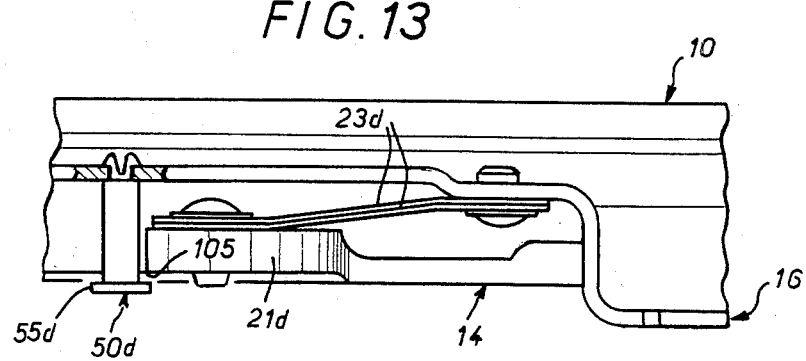
FIG. 13 shows in elevation a variant of the embodiment shown in FIGS. 11 and 12.

FIG. 13 shows a variant of the embodiment of FIGS. 11 and 12.

Here the peg 50d is of greater axial extent and, in the storage position, the cylindrical shoulder 55d butts up against an abutment surface 105 on the outside surface of the lug 21d of the pressure plate 14.

A further embodiment of the present invention will now be described with reference to FIG. 14.

The internal perimeter of the pressure plate 14 is provided with projections 120 formed with an opening 121. A peg 50e passes with clearance through the diaphragm spring 11 and an opening 122 formed in the cover 10, being supported by the pressure plate and immobilized in the axial direction in the bore 121 by its lugs 52e and its shoulders 53e and 54e.

The barrel 51e slides freely in the bore 122 whereas, in the storage position of the assembly, the shoulder 55e butts up against an abutment surface 123 on the cover 10 around the bore 122.

Note that in the embodiments previously described the limiting and retaining members were disposed outside the area in which the diaphragm spring 11 bears on the pressure plate 14. In this instance, they are situated within this area.

A further embodiment of the present invention will now be described with reference to FIG. 15.

In this embodiment, the means whereby the diaphragm spring 11 pivots comprise studs 130 attached to the cover 10 and carrying rings 131, 132, in a manner known to those skilled in the art. The studs 130 comprise an axial bore 133.

A peg 50f is inserted into each bore 133 and rendered fast with the stud 130 in the axial direction by its elastic lugs 52f and its shoulders 53f and 54f. The barrel 51f slides in a bore 134 in the pressure plate, whereas, in the storage position, the shoulder 55f butts up against an abutment surface 135 defined in the pressure plate by a bore 136 coaxial with the bore 134 and of greater diameter. It will be understood that the diameters of the bore 136 and the cylindrical shoulder 55f are such that, in operation, said shoulder slides freeely.

Note that the pegs 50f and the studs 130 are disposed between the inside and outside perimeters of the pressure plate.

There will now be decribed another embodiment of the invention as applied to a "pull" type diaphragm spring clutch.

This description will be given with reference to FIG. 16 which is a partial and schematic view of a clutch of this kind.

The diaphragm spring 11 comprising the Belleville washer has its outside part bearing on the cover 10 and the inside perimeter of its part 12 forming the Belleville washer bearing on the pressure plate 14.

In the conventional manner, drive tangs 23g extend from the lugs 21g to areas on the peripheral flange of the cover 10 and provide rotational coupling between the pressure plate 14 and the cover 10.

As in the embodiment shown in FIG. 1, a hollow rivet 40g comprising a hollow cylindrical body 41g and two annular clamping heads 42g, 42g', attaches said tangs 23g to the lugs 21g. The cover 10 is provided with a bore 140 in line with the rivets 41g.

A peg 50g is attached to the cover 10 by its lugs 52g and its shoulders 53g and 54g, being inserted into the bore 140. The barrel 51g slides freely in the bore 49g in the rivet 40g. In the storage position, the cylindrical shoulder 55g of the peg 50g butts up against an abutment surface 141 disposed on the clamping head 42g of the rivet 40g.

There will now be described with reference to FIGS. 17 and 18 two further embodiments in which the diaphragm spring 11 of the clutch cover assembly is formed with the retaining edge or the abutment surface on which the cylindrical shoulder on the peg acts.

In FIG. 17, a peg 50h is attached to the cover 10 in the axial direction by its lugs 52h and its shoulders 53h and 54h. These lugs 52h are inserted into a bore 150 formed in the cover 10 and disposed so that the barrel 51h of the peg 50h slides freely in the openings 151 in the diaphragm spring 11 at the junction of its fingers 13 with the part 12 forming the Belleville washer.

An abutment surface 152 is thus formed, in face-to-face relationship with the cylindrical shoulder 55h of the peg 50h, partly on the part 12 and partly on two adjacent fingers 13 of the diaphragm spring 11.

In the storage position, said shoulder 55h butts up against said abutment surface 152.

In FIG. 18, the peg 50i is carried by a hollow rivet 40i used, as in the embodiment shown in FIGS. 1 to 6, to attach the tangs 23i. The barrel 51i of the peg 50i slides freely in face-to-face relationship with the outside perimeter 160 of the diaphragm spring 11, clearance allowing for the tilting movement of the diaphragm spring being provided for this purpose between the barrel 51i and the outside perimeter 160 of the diaphragm spring. The shoulder 55i is adapted to cooperate in the storage position with an abutment surface 161 in face-to-face relationship with said shoulder on the outside perimeter 160 of the diaphragm spring 11.

It will be understood that various changes in the details, materials and arrangement of parts, which have been herein described and illustrated in order to explain the nature of the invention, may be made by those skilled within the art within the principle and scope of the invention as expressed in the appended claims.

For example, the embodiments shown in FIGS. 1 to 16 relate to diaphragm spring clutches. It will be understood that the present invention is not limited to this type of clutch and that its teaching remains valid if other elastic means are used in place of the diaphragm spring, such as helical coil springs, for example.

Note also that in the description and in most of the figures a single peg 50 is described and shown. It need hardly be said that the number of pegs to be used per assembly may vary between the various embodiments and depending on the configuration of the clutch cover assembly in question. For example, in the embodiment shown in FIGS. 1 to 5, three pegs 50 are attached to the pressure plate.

As a general rule, it is necessary to utilize several pegs 50 per assembly to ensure proper retention of the pressure plate.

Note also that in certain cases it is possible to insert a wedge between the shoulder 55 and the abutment surface to limit the projection of the diaphragm spring relative to the cover in the clutch engaged position and so to facilitate removal of the assembly.

The present invention offers great flexibility in utilization, the pegs being usuable only on assemblies intended for use as replacement parts, while improving the productivity of clutch cover assembly production lines.

I claim:

1. A clutch cover assembly comprising a combination of at least three components adapted to be pre-assembled prior to utilization, said combination incorporating a cover which is fixed in the axial direction, a plate which is movable in the axial direction and elastic means operatively disposed between said cover and said plate, said clutch cover assembly further comprising at least one peg adapted to limit movement of said plate and comprising at least one snap-action fastener adapted to immobilize it in the axial direction relative to a first of said components and a head incorporating a barrel and a retaining shoulder, a second of said components having a retaining edge and said barrel being radially spaced from said retaining edge so as to permit, in normal operation of said assembly, relative sliding movement of said barrel and said edge, and said shoulder being adapted for engagement with said edge in an abutting relationship when said assembly is in a storage configuration.

2. A clutch cover assembly according to claim 1, wherein said snap-fastener comprises two lugs adapted to deform elastically towards one another and incorporating a shoulder which acts in conjunction with a bearing shoulder.

3. A clutch cover assembly according to claim 2, wherein said bearing shoulder is defined by an annular space delimited by a cylinder on the base of said barrel from which said lugs are formed.

4. A clutch cover assembly according to claim 1, wherein said second component comprises at least one abutment surface adjacent said retaining edge.

5. A clutch cover assembly according to claim 4, wherein said abutment surface is formed around a bore within which said barrel is freely slidable.

6. A clutch cover assembly according to claim 4, wherein said retaining shoulder on said head of said peg is cylindrical and comprises a surface which, in said storage position, bears on said abutment surface.

7. A clutch cover assembly according to claim 4, wherein said abutment surface is formed on a drive tang of said plate.

8. A clutch cover assembly according to claim 4, wherein said abutment surface is formed on said cover.

9. A clutch cover assembly according to claim 4, wherein said abutment surface is formed on said plate.

10. A clutch cover assembly according to claim 9, wherein said peg is disposed between the inner and the outer perimeters of said plate.

11. A clutch cover assembly according to claim 10, wherein said elastic means comprise a diaphragm spring and further comprising actuating means for said diaphragm spring incorporating at least one stud, said peg being immobilized in the axial direction in a bore in said stud.

12. A clutch cover assembly according to claim 4, wherein said elastic means comprise a diaphragm spring and said abutment surface is formed on said diaphragm spring.

13. A clutch cover assembly according to claim 12, wherein said diaphragm spring comprises radial fingers and a section forming a Belleville washer and said abutment surface is formed partly on said section forming said Belleville washer and partly on two adjacent radial fingers of said diaphragm spring.

14. A clutch cover assembly according to claim 1, further comprising at least one drive tang retaining rivet formed with a bore and wherein said peg is immobilized in the axial direction in said bore.

15. A clutch cover assembly according to claim 1, wherein said retaining shoulder is frustonconical.

* * * * *